(12) United States Patent
Steele (10) Patent No.: US 9,059,871 B2
(45) Date of Patent: Jun. 16, 2015

(54) POLICY-BASED COMMUNICATION SYSTEM AND METHOD

(75) Inventor: Philip Renwell Steele, Hillsburgh (CA)

(73) Assignee: Redknee Inc., Mississauga (CA)

( * ) Notice: Subject to any disclaimer, the term of this patent is extended or adjusted under 35 U.S.C. 154(b) by 502 days.

(21) Appl. No.: 12/810,551

(22) PCT Filed: Dec. 27, 2007
(Under 37 CFR 1.47)

(86) PCT No.: PCT/CA2007/002372
§ 371 (c)(1),
(2), (4) Date: Oct. 29, 2010

(87) PCT Pub. No.: WO2009/082806
PCT Pub. Date: Jul. 9, 2009

(65) Prior Publication Data
US 2011/0246586 A1    Oct. 6, 2011

(51) Int. Cl.
*G06F 15/173* (2006.01)
*G06F 15/16* (2006.01)
*H04L 12/66* (2006.01)
*H04L 12/14* (2006.01)
*H04L 12/24* (2006.01)
*H04L 29/08* (2006.01)

(52) U.S. Cl.
CPC ............ *H04L 12/66* (2013.01); *H04L 12/14* (2013.01); *H04L 12/1467* (2013.01); *H04L 41/0893* (2013.01); *H04L 67/306* (2013.01); *H04L 67/327* (2013.01)

(58) Field of Classification Search
USPC ................................. 709/226, 223, 206, 204
See application file for complete search history.

(56) References Cited

U.S. PATENT DOCUMENTS

| | | |
|---|---|---|
| 6,473,622 B1 | 10/2002 | Meuronen |
| 6,611,875 B1 | 8/2003 | Chopra et al. |
| 6,615,262 B2 | 9/2003 | Schweitzer et al. |
| 6,621,793 B2 | 9/2003 | Widegren |
| 6,661,780 B2 | 12/2003 | Li |
| 6,667,780 B2 | 12/2003 | Cho |

(Continued)

FOREIGN PATENT DOCUMENTS

| | | |
|---|---|---|
| CN | 1937623 | 3/2007 |
| DE | 10148540 A1 | 4/2003 |

(Continued)

OTHER PUBLICATIONS

Technical Specification 3GPP TS 23.203 V7.4.0 (1007-09) "3rd Generation Partnership Project; Technical Specification Group Services and System Aspects; Policy and charging control architecture (Release 7)".

(Continued)

*Primary Examiner* — Kyung H Shin
(74) *Attorney, Agent, or Firm* — Gardner, Linn, Burkhart & Flory, LLP (57) ABSTRACT

A communication system and method is provided that includes a gateway. The gateway interconnects a client device and a server that hosts a service. The gateway is configured to determine the characteristics of service being requested by the client device and to communicate with a policy server in order to determine a policy that is to be applied to the fulfillment of the request for the service, assuming that the policy actually permits the fulfillment of the request.

18 Claims, 3 Drawing Sheets

(56) References Cited

U.S. PATENT DOCUMENTS

| | | |
|---|---|---|
| 6,714,515 B1 | 3/2004 | Marchand |
| 6,718,380 B1 | 4/2004 | Mohaban et al. |
| 6,775,267 B1 | 8/2004 | Kung |
| 6,785,534 B2 | 8/2004 | Ung |
| 6,847,708 B1 | 1/2005 | Abbasi et al. |
| 6,891,811 B1 | 5/2005 | Smith |
| 6,895,235 B2 | 5/2005 | Padgett et al. |
| 6,947,531 B1 | 9/2005 | Lewis |
| 7,003,307 B1 | 2/2006 | Kupsh |
| 7,039,037 B2 | 5/2006 | Wang |
| 7,107,068 B2 | 9/2006 | Benzon |
| 7,139,387 B2 | 11/2006 | Dahari |
| 7,194,235 B2 | 3/2007 | Nykanen et al. |
| 7,215,970 B2 | 5/2007 | Corrigan |
| 7,269,431 B1 | 9/2007 | Gilbert |
| 7,272,133 B2 | 9/2007 | Valin et al. |
| 7,302,254 B2 | 11/2007 | Valloppillil |
| 7,340,214 B1 | 3/2008 | Hamberg |
| 7,440,441 B2 | 10/2008 | Lakhani et al. |
| 2001/0026553 A1 | 10/2001 | Gallant |
| 2001/0053687 A1 | 12/2001 | Sivula |
| 2001/0055291 A1 | 12/2001 | Schweitzer |
| 2002/0052754 A1 | 5/2002 | Joyce |
| 2002/0103925 A1 | 8/2002 | Sheth |
| 2002/0107754 A1 | 8/2002 | Stone |
| 2002/0126701 A1 | 9/2002 | Requena |
| 2002/0152319 A1 | 10/2002 | Amin |
| 2002/0152321 A1 | 10/2002 | Le |
| 2002/0176378 A1 | 11/2002 | Hamilton |
| 2003/0003932 A1 | 1/2003 | Corrigan |
| 2003/0009580 A1 | 1/2003 | Chen |
| 2003/0035409 A1 | 2/2003 | Wang |
| 2003/0037176 A1 | 2/2003 | Dannehr et al. |
| 2003/0050042 A1 | 3/2003 | Olah |
| 2003/0051041 A1 | 3/2003 | Kalavade |
| 2003/0069922 A1 | 4/2003 | Arunachalam |
| 2003/0074286 A1 | 4/2003 | Rodrigo |
| 2003/0083990 A1 | 5/2003 | Berg |
| 2003/0096605 A1 | 5/2003 | Schlieben |
| 2003/0105720 A1 | 6/2003 | Ishibashi |
| 2003/0105864 A1 | 6/2003 | Mulligan et al. |
| 2003/0112936 A1 | 6/2003 | Brown |
| 2003/0134615 A1 | 7/2003 | Takeuchi |
| 2003/0157925 A1 | 8/2003 | Sorber |
| 2003/0158902 A1 | 8/2003 | Volach |
| 2003/0187996 A1 | 10/2003 | Cardina |
| 2003/0207686 A1 | 11/2003 | Ramanna |
| 2003/0214958 A1 | 11/2003 | Madour |
| 2004/0022191 A1 | 2/2004 | Bernet et al. |
| 2004/0028055 A1 | 2/2004 | Madour |
| 2004/0066769 A1 | 4/2004 | Ahmavaara |
| 2004/0092250 A1 | 5/2004 | Valloppillil |
| 2004/0092272 A1 | 5/2004 | Valloppillil |
| 2004/0095924 A1 | 5/2004 | Holur |
| 2004/0105424 A1 | 6/2004 | Skoczkowski |
| 2004/0117312 A1 | 6/2004 | Lialiamou |
| 2004/0127215 A1 | 7/2004 | Shaw |
| 2004/0225717 A1* | 11/2004 | Cuervo ................... 709/206 |
| 2004/0236686 A1 | 11/2004 | Bohmer |
| 2005/0002407 A1 | 1/2005 | Shaheen et al. |
| 2005/0100035 A1 | 5/2005 | Chiou |
| 2005/0131984 A1 | 6/2005 | Hofmann et al. |
| 2005/0185661 A1 | 8/2005 | Scott et al. |
| 2005/0185664 A1 | 8/2005 | Chaskar et al. |
| 2005/0195743 A1 | 9/2005 | Rochberger |
| 2005/0272465 A1 | 12/2005 | Ahmavaara |
| 2006/0008063 A1 | 1/2006 | Harnesk |
| 2006/0028980 A1 | 2/2006 | Wright |
| 2006/0031297 A1 | 2/2006 | Zuidema |
| 2006/0034281 A1 | 2/2006 | Cain et al. |
| 2006/0039374 A1 | 2/2006 | Belz |
| 2006/0072595 A1 | 4/2006 | Broberg et al. |
| 2006/0075467 A1 | 4/2006 | Sanda |
| 2007/0281699 A1 | 12/2007 | Rasanen |
| 2008/0013531 A1 | 1/2008 | Elliott et al. |
| 2008/0059635 A1* | 3/2008 | Seiferth et al. ................ 709/226 |

FOREIGN PATENT DOCUMENTS

| | | |
|---|---|---|
| EP | 1026853 A3 | 8/2000 |
| EP | 1278359 A2 | 1/2003 |
| EP | 1278383 A2 | 1/2003 |
| EP | 1298599 A1 | 4/2003 |
| EP | 1309213 A1 | 5/2003 |
| EP | 1320214 A | 6/2003 |
| EP | 2045974 | 4/2009 |
| WO | 0163883 A2 | 8/2001 |
| WO | 0169891 A1 | 9/2001 |
| WO | 03032618 A1 | 5/2003 |
| WO | 03037023 A1 | 5/2003 |
| WO | 03047164 A2 | 6/2003 |
| WO | 2007/138407 A2 | 12/2007 |

OTHER PUBLICATIONS

International Search Report and Written Opinion from corresponding Patent Cooperation Treaty Application No. PCT/CA2007/002372, dated Sep. 10, 2008.
ETSI Standard Draft ETSI Res 282 003 V0.8.9 (Oct. 2007) "Telecommunications and Internet Converged Services and Protocols for Advanced Networking (TISPAN); Resource and Admission Control Sub-system (RACS); Functional Architecture; Release 2" DTS/TISPAN-02036-NGN-R2.
Supplemental European Search Report and Search Opinion dated Jun. 3, 2013 from corresponding European Application No. EP 07855652.9.
3GPP TS 23.203 V7.4.0. "3rd Generation Partnership Project; Technical Specification Group Services and System Aspects; Policy and Charging Control Architecture" (release 7) Sep. 26, 2007 Retrieved From the Internet: <htt://www.3gpp.orglft/Specslarchivel23_series3.203/23203- 740.zip> pp. 11-30,42,47-48,58-59.
Fonknechten D et al. "Service Aware Intelligent GGSN" Alcatel Telecommunications Review, No. Q4 2003, Oct. 1, 2003, pp. 1-10.
Dippelhofer A: "Flexible Abrechnung" Jan. 17, 2003, pp. 34-36, XP001164781, ISSN:0016-2814.
Lin, Y et al.: "Mobile Prepaid Phone Services" IEEE Personal Communications, Jun. 2000, pp. 6-4, XP011092391.
Ganna, M. et al. "On using policies for managing services provisioning in agent-based heterogeneous environments for mobile users" Sixth IEEE International Workshop on Policies for Distributed Systems and Networks, Jun. 6-8, 2005; pp. 149-158.
Salkintzis A. et al. "Seamless multimedia QoS across UMTS and WLANs", IEEE 61st Vehicular Technology Conference, VTC, May 30-Jun. 1, 2005, vol. 4, pp. 2284-2288.
Cheung, M. et al. "Applying a service-on-demand policy management framework to an ETTx environment", IEEE/IFIP Network Operations and Management Symposium, 2004, NOM 2004, Apr. 19-23, 2004, vol. 2, pp. 101-114.

* cited by examiner

POLICY-BASED COMMUNICATION SYSTEM AND METHOD

FIELD

The present specification relates generally to telecommunications and more particularly relates to a policy-based communication system and method.

BACKGROUND

Hardware advances in computing devices and the networks which interconnect those devices has facilitated an explosion in software applications. Applications such as real-time chat, voice and video are increasingly commonplace and widespread. Voice over Internet Protocol ("VOIP") telephony allows real-time duplex voice communications to be carried over traditional data channels, potentially obviating the need for traditional voice channels, without the latency or jitter normally associated with the specifications of such data channels.

While somewhat behind wireline networks, wireless networks are also increasing in bandwidth to allow substantially real-time chat, voice and video applications to be carried thereover. Likewise, the processing power of handheld portable devices such as cellular telephones and wireless personal digital assistants can now accommodate such applications.

Traditional revenue sources for wireline and wireless networks include voice telephony and traditional data communications. However, the above-mentioned advances are confusing the means by which network operators are compensated by consumers. For example, traditional voice channels were configured to be carried over twisted pair copper telephone wires, yet, technology advances now permit high speed Internet communications to be carried over twisted pair. Still further advances now permit voice communications to be carried over those Internet connections. As a result, the subscriber may eschew the underlying voice service in favour of the Internet service which now serves to provide both voice and traditional data connectivity for the subscriber. This erodes the underlying revenue base for the wireline carrier, whose business model may depend on charging separate fees for both voice and traditional data services. Hardware advances now raise the same possibility of erosion of revenue sources for wireless carriers, which originally offered only wireless voice connectivity but are increasing offering both voice and data connectivity. However the subscriber may be able to find applications to carry the voice service over the data link and thereby avoid charges for voice services.

The preceding examples are the tip of the iceberg. Applications such as Skype, Google Maps, You Tube, file sharing services were unforeseen applications that can radically alter the bandwidth profiles for each subscriber, with deleterious effects on bandwidth and quality-of-service allocations which did not anticipate these services. The result can be a serious deterioration of quality of service for some subscribers as other subscribers unfairly monopolize all available bandwidth.

To address the foregoing, it is increasingly becoming known to monitor wireless traffic so that it can be classified and further processed according to classification, such further processing including the possibility of blocking the traffic and/or to apply different rates of charge according to classification. However, current network infrastructures can still be improved.

SUMMARY

A communication system and method is provided that includes a gateway. The gateway interconnects a client device and a server that hosts a service. The gateway is configured to determine the characteristics of service being requested by the client device and to communicate with a policy server in order to determine a policy that is to be applied to the fulfillment of the request for the service, assuming that the policy actually permits the fulfillment of the request.

DETAILED DESCRIPTION OF THE EMBODIMENTS

The following definitions are used in this specification:

"3GPP Standards" means the Technical Specifications as have been produced by the 3rd Generation Partnership Project (3GPP) as updated from time to time.

"AAA" means Authentication, Authorization and Accounting

"AF" means Application Function as described in 3GPP TS 23.203—"3rd Generation Partnership Project; Technical Specification Group Services and System Aspects; Policy and charging control architecture" as updated from time to time "AS" means Application Server "CDR" means Call Detail Record "DIAMETER protocol" means the computer networking protocol for AAA that is a successor to RADIUS as generally described by IETF RFC 3588—"Diameter Base Protocol" as updated from time to time "DPI" means Deep Packet Inspection "GGSN" means GPRS Gateway Service Node as described in 3GPP TS 23.203—"3rd Generation Partnership Project; Technical Specification Group Services and System Aspects; Policy and charging control architecture" as updated from time to time "Gx" means the link and protocol that resides between the PCEF and the PCRF as generally described in 3GPP TS 23.203—"3rd Generation Partnership Project; Technical Specification Group Services and System Aspects; Policy and charging control architecture" as updated from time to time "Gy" means the link and protocol that resides between the OCS and the PCEF as generally described in 3GPP TS 23.203—"3rd Generation Partnership Project; Technical Specification Group Services and System Aspects; Policy and charging control architecture" as updated from time to time "GPRS" means General Packet Radio Service "IETF" means Internet Engineering Task Force "IMS" means IP Multimedia Subsystem as described in 3GPP TS 23.228—"3rd Generation Partnership Project; Technical Specification Group Services and System Aspects; IP Multimedia Subsystem (IMS); Stage 2" as updated from time to time.

"IP" means Internet Protocol

"ISDN" means Integrated Services Digital Network

"MSISDN" means Mobile Subscriber ISDN Number

"OCS" means Online Charging Server as described in 3GPP TS 23.203—"3rd Generation Partnership Project; Technical Specification Group Services and System Aspects; Policy and charging control architecture" as updated from time to time "PCC" means Policy and Charging Control as described in 3GPP TS 23.228—"3rd Generation Partnership Project; Technical Specification Group Services and System Aspects; IP Multimedia Subsystem (IMS); Stage 2" as updated from time to time "PCEF" means Policy Charging Enforcement Function as described in 3GPP TS 23.203—"3rd Generation Partnership Project; Technical Specification Group Services and System Aspects; Policy and charging control architecture" as updated from time to time "PCRF" means Policy Charging Rating Function as described in 3GPP TS 23.203—"3rd Generation Partnership Project; Technical Specification Group Services and System Aspects; Policy and charging control architecture" as updated from time to time.

"P-CSCF" means Proxy Call Session Control Function as described in 3GPP TS 23.228—"3rd Generation Partnership Project; Technical Specification Group Services and System Aspects; IP Multimedia Subsystem (IMS); Stage 2" as updated from time to time "RADIUS" means Remote Authentication Dial In User Service "RAT type" means Radio Access Technology type "Rx" means the link and protocol that resides between the AF and the PCRF as generally described in 3GPP TS 23.203—"3rd Generation Partnership Project; Technical Specification Group Services and System Aspects; Policy and charging control architecture" as updated from time to time "RFC" means Request for Comments "SIP" means Session Initiation Protocol "SCP" means Service Control Point "SPR" means Subscription Profile Repository as generally described in 3GPP TS 23.203—"3rd Generation Partnership Project; Technical Specification Group Services and System Aspects; Policy and charging control architecture" as updated from time to time "SIP identity" means canonical SIP Uniform Resource Identifier employed to reach a user or device (such as 'sip:alice@atlanta.com')

"SUB ID" means any unique Subscriber Identifier. SUB ID can be, for example, a MSISDN or a SIP identity.

Figure 1:
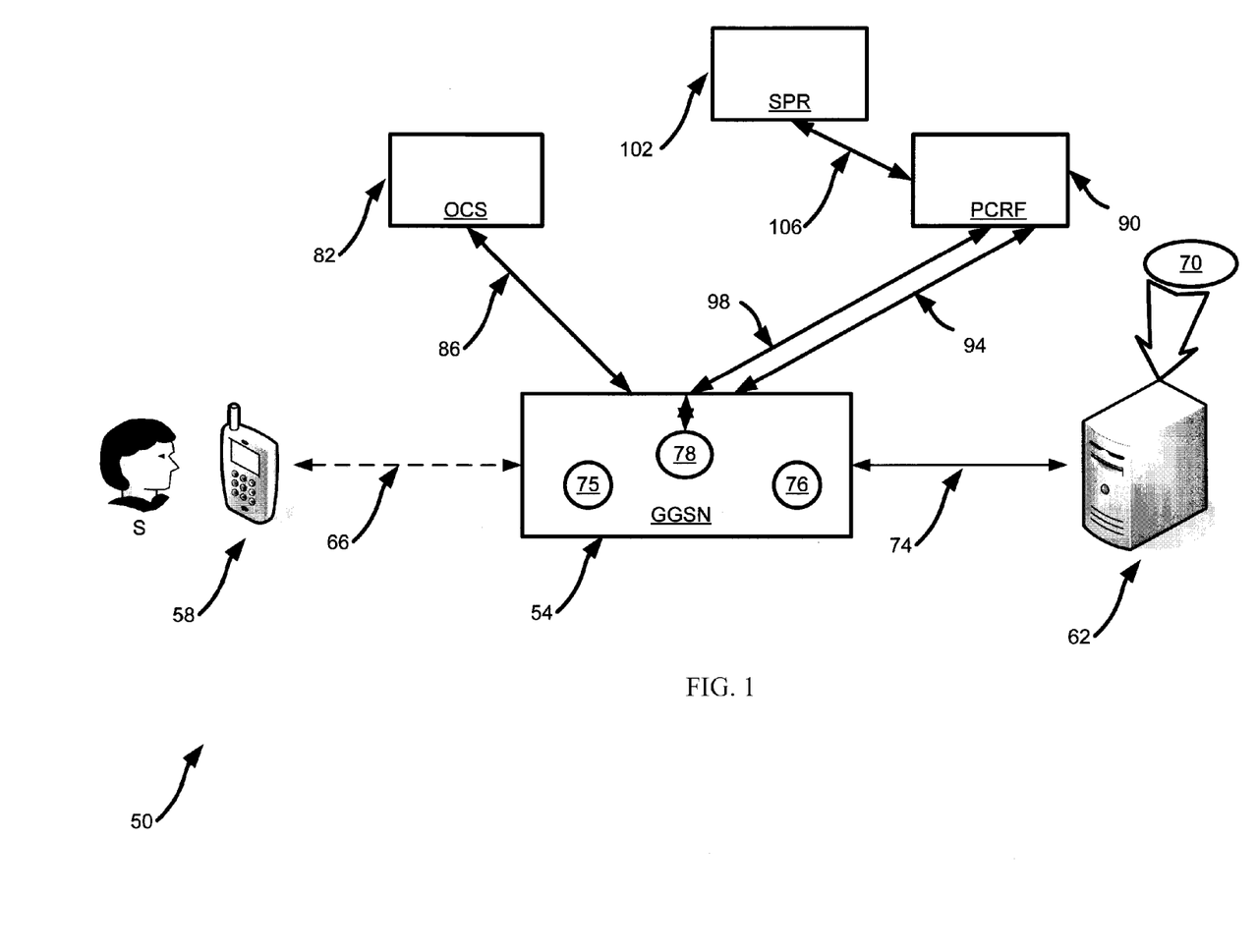
FIG. 1 is a schematic representation of a communication system.

Referring now to FIG. 1, a communication system is indicated generally at 50. System 50 comprises a GGSN 54 which interconnects a wireless client device 58 and a server 62. GGSN 54 is based on known GGSN infrastructures, with novel modifications thereto as will be discussed further below. Those skilled in the art will recognize that the GGSN 54 may be manifested as other network elements in the context of other access technologies. For example, a packet serving data node (PDSN) for a code division multiple access (COMA) based network; the IP edge router for a European Telecommunications Standards Institute (ETSI) based network; the cable Modem termination system (CMTS) for a PacketCable based network; a access service network (ASN) gateway for a WiMax based network; or a deep-packet inspection node for a generic internet protocol based network.

Wireless client device 58 is associated with a subscriber S and can be based on any known or future-conceived mobile or nomadic communication equipment including, for example, a cellular telephone or a wireless personal digital assistant. While not shown herein, it will be understood by those skilled in the art that the wireless client device 58 includes a hardware configuration that may comprise one or more input devices in the form of a keyboard, microphone and the like; one more output devices in the form of a display, a speaker and the like; a radio for conducting wireless communications; all of which are interconnected by a microcomputer comprised of one or more central processing units that itself is connected to volatile memory and non-volatile memory.

Wireless client device 58 connects to GGSN 54 via a first link 66. First link 66 is based on any combination of wireless and wired infrastructures that are now-known, or future-conceived, that can connect wireless client device 58 with GGSN 54. For example, first link 66 can conform with a 3GPP infrastructure that includes a wireless base station that communicates wirelessly with the radio in client device 58, backhaul such as a T1, a mobile switching center, routers and the like.

Server 62 can be based on any known or future-conceived servers, including for example, a web server or any other type of server capable of hosting a service 70 on behalf of client device 58 and for use by subscriber S. Any type of service 70 is contemplated including applications. Examples of services include, but are not limited to, software downloads, web-pages, instant messaging, email, web-mail, mapping services, location applications, social networking services and applications, file sharing services and applications, peer-to-peer services, music or video streams or downloads. Thus, it should be understood that server 62 can be any other computing device to which client device 58 may communicate, including another client device, and thus service 70 can also include peer-to-peer type applications including voice over IP, and file sharing. While not shown herein, it will understood by those skilled in the art the server 62 includes a hardware configuration that may comprise one or more input devices in the form of a keyboard, a mouse and the like; one more output devices in the form of a display, and the like; a network interface for conducting network communications; all of which are interconnected by a microcomputer comprised of one or more central processing units that itself is connected to volatile memory and non-volatile memory.

Server 62 connects to GGSN 54 via a second link 74. Second link 74 is based on any combination of wireless or wired infrastructures that are now-known, or future-conceived, that can connect server 62 with GGSN 54. For example, second link 74 can include a 3GPP infrastructure associated with GGSN 54 that includes a gateway to a local area network or wide area network that in turn uses a data protocol such as the IP. Likewise, second link 74 can include relevant portions of the Internet associated with server 62, which connects to the network interface in server 62.

GGSN 54 itself can be based on any known or future-conceived servers having a hardware structure that is generally consistent with the hardware structure discussed in relation to server 62 except including the appropriate interfaces to connect to link 66 and link 74 and (other links as discussed below as shown in FIG. 1), as well as including software that configures the server to fulfill the function of a GGSN as prescribed by the relevant 3GPP standards. GGSN 54 is configured to implement a DPI engine 75. Those skilled in the art will recognize that the methods of identifying and classifying distinct subscriber and application specific bearer flows are collectively referred to as 'Deep Packet Inspection' capabilities. With respect to parametric information that is inherent in the bearer data flow that can be used to identify and classify subscriber or application specific data flows, this may include the source and destination internet protocol addresses, port information, protocol information, and other information that conveys the access technology used (such as the Radio Access Technology parameter). Information that may be conveyed between the device 58 and the server 62 may include the application identifier, flow identifiers, and the media type(s) associated with a given service or application. In addition to the utilization of explicit addressing or application information inherent in the data flow or conveyed from external network elements or application servers, the DPI engine 75 may recognize patterns or characteristic traffic flows as indicative 'signatures' that are associated with a given service or application. GGSN 54 is also configured to implement a PCEF 76 as will be discussed further below. In addition, GGSN 54 is configured to implement application function engine 78, which will be also discussed in greater detail below. In a present embodiment, DPI engine 75, PCEF 76 and application function engine 78 are implemented as software processes on GGSN 54.

GGSN 54 also connects to an OCS 82 via a third link 86. OCS 82 itself can be based on any known or future-conceived servers having a hardware structure that is generally consistent with the hardware structure discussed in relation server to 62 except including the appropriate interfaces to connect to link 86, as well as including software that configures the server to fulfill the function of an OCS as prescribed in the 3GPP standards OCS 82 is configured to fulfill charging functions in relation to the subscriber account associated with subscriber S (such as maintaining records in association with the MSISDN of device 58) in at least one of a post-paid and a pre-paid context. In the post-paid context OCS 82 is thus configured to generate CDRs that can be used to add charges to the bill or account of a subscriber. In the pre-paid context OCS 82 is thus configured to fulfill the functions of an SCP (and in fact OCS 82 can be implemented as an SCP) that can be used to deduct amounts from a subscriber's prepaid balance. Regardless of the post-paid or pre-paid context, in a present exemplary embodiment OCS 82 is configured to perform such charging in a substantially real-time manner, whereby as the service is being delivered to subscriber S, the charges associated with that service are being applied. Third link 86 can be based on any physical infrastructure that is suitable for connecting GGSN 54 to OCS 82 as will now occur to those of skill in the art. Third link 86 is also configured to carrying communications using the Gy protocol. Those skilled in the art will now recognize that the Gy protocol may be manifested as other protocols in the context of other access technologies. For example, where the analogous protocol for a code division multiple access (CDMA) based network is generally described in 3GPP2 X.S0013—"All-IP Core Network Multimedia Domain" as amended from time to time and where the analogous protocol for an internet protocol access technology is generally described in ETSI ES 282 003: "Telecommunications and Internet converged Services and Protocols for Advanced Networking (TISPAN); Resource and Admission Control Sub-system (RACS) Functional Architecture" as amended from time to time.

GGSN 54 also connects to a PCRF 90 via a fourth link 94 and a fifth link 98. PCRF 90 itself can be based on any known or future-conceived servers having a hardware structure that is generally consistent with the hardware structure discussed in relation server to 62 except including the appropriate interfaces to connect to links 94 and 98, as well as including software that configures the server to fulfill the function of a PCRF as prescribed in the 3GPP standards. PCRF 90 is configured to fulfill tariff decision, bandwidth quality decision and traffic gating decision (collectively Traffic Policy Decision) functions which in turn can be used by PCEF 76 within GGSN 54 and eventually by OCS 82 in order to determine the actual charge. PCRF 90 is thus configured to decide traffic policies between device 58 and server 62, including, but not limited to, traffic associated with the access of service 70 on device 58. Indeed PCRF 90 is configured to decide traffic policies on all traffic types carried by GGSN 54. PCRF 90 is also configured to perform such traffic policy decision in substantially real time in order to coordinate with the real time functionality of OCS 82.

Fourth link 94 and fifth link 98 can be based on any physical infrastructure that is suitable for connecting GGSN 54 to PCRF 90, and indeed can be carried over the same physical infrastructure and so that is to say that fourth link 94 and fifth link 98 need not be carried over physically separate links but can, if desired, be carried over the same physical link. In a present embodiment fourth link 94 is configured to communications using the Gx protocol. In a more general embodiment, fourth link 94 is configured to carry communications relative to the final determination of an actual traffic policy decision for a given traffic that is being carried between device 58 and server 62. In a present embodiment, fifth link 98 is configured to carry communications using the Rx protocol. In a more general embodiment, fifth link 98 is configured to carry communications relative to the characteristics of service 70 for use by PCRF 90 in determining the actual traffic policy decision that is determined by PCRF 90 for a given service (e.g. service 70) as applied to a given session for the delivery of that service. Those skilled in the art will now recognize that the Gx and Rx protocols may be manifested as other protocols in the context of other access technologies. For example, where the analogous protocols for a code division multiple access (CDMA) based network are generally described in 3GPP2 X.S0013—"All-IP Core Network Multimedia Domain" as amended from time to time and where the analogous protocols for an internet protocol access technology are generally described in ETSI ES 282 003: "Telecommunications and Internet converged Services and Protocols for Advanced Networking (TISPAN); Resource and Admission Control Sub-system (RACS) Functional Architecture" as amended from time to time.

PCRF 90 also connects to SPR 102 via sixth link 106. SPR 102 can be implemented as a file server which includes a microcomputer, a network interface and persistent storage in order to maintain data and in order to allow that data to be accessed by PCRF 90 and any other network element that connects to SPR 102. The data that SPR 102 is configured to maintain includes profile information about subscriber S. Such profile information can include, but need not be limited to, an identification of subscriber S (including for example the MSISDN of device 58), whether subscriber S is a prepaid or postpaid subscriber, the various types of traffic that subscriber S is permitted to received on device 58, the various rates for any traffic that subscriber S accesses on device 58, including rates for traffic associated with the accessing of service 70 on device 58, subscriber preferences such as a preferred quality of service to be associated with accessing a given service 70 via device 58, and subscriber or network operator imposed limitations such as an upper bound on the total bandwidth consumed by subscriber S via device 58.

Sixth link 106 can be based on any desired physical link and protocol in order to communicate subscriber profile data to PCRF 90. It should now be apparent that SPR 102 can be implemented within PCRF 90, or it can be situated remotely from PCRF 90 so that a plurality of different PCRFs (not shown) and other network elements can centrally access profile data relative to subscriber 102.

Figure 2:
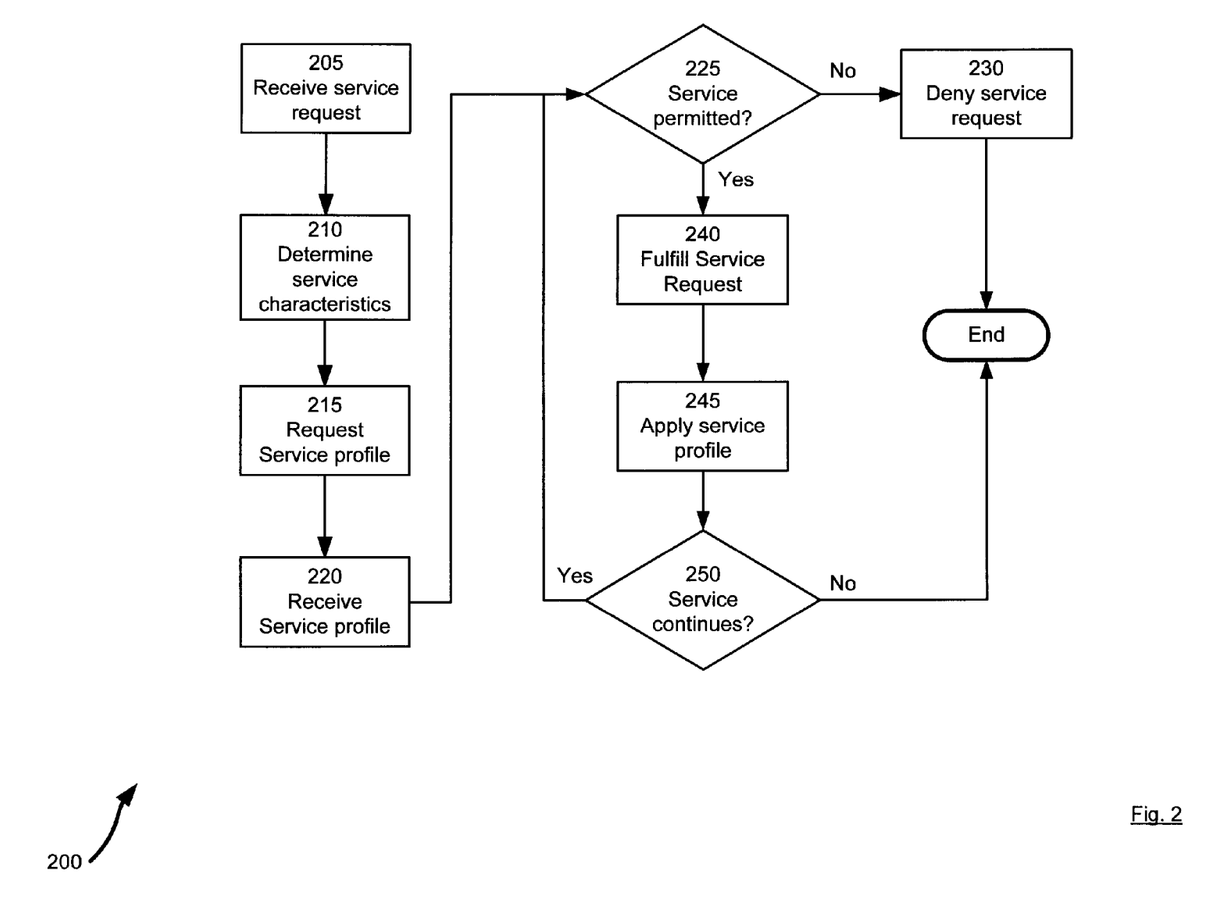
FIG. 2 is a flow-chart depicting a method of communication.

Referring now to FIG. 2, a communication method represented in the form of a flow-chart is indicated generally at 200. Method 200 can be implemented using system 50 or functionally equivalent modified versions of system 50. To help provide further understanding relative to method 200 and system 50, method 200 will be discussed in relation to exemplary performance of method 200 using system 50.

At block 205, a service request is received. Block 205 is performed by GGSN 54 when, for example, GGSN 54 receives a request from device 58 to access service 70.

At block 210, service characteristics are determined. In the present example, block 210 is performed in two parts. First, the service request from block 205 is examined using DPI engine 75 embedded within GGSN 54, which, at a packet layer, examines the service request in order to specific information from packets therein in accordance with the DPI functionality provided by the DPI engine 75. Those skilled in the art will recognize that the methods of identifying and classifying distinct subscriber and application specific bearer flows are collectively referred to as 'Deep Packet Inspection' capabilities. With respect to parametric information that is inherent in the bearer data flow that can be used to identify and classify subscriber or application specific data flows, this may include the source and destination internet protocol addresses, port information, protocol information, and other information that conveys the access technology used (such as the Radio Access Technology parameter). Information that may be conveyed between the device 58 and the server 62 may include the application identifier, flow identifiers, and the media type(s) associated with a given service or application. In addition to the utilization of explicit addressing or application information inherent in the data flow or conveyed from external network elements or application servers, the DPI engine 75 may recognize patterns or characteristic traffic flows as indicative 'signatures' that are associated with a given service or application. Next, application function engine 78, using the information extracted by DPI engine 75, determines the service characteristics.

A further non-limiting example at this point is helpful to understand the general features of the teachings herein. Assume that service 70 is the well-known mobile application Google™ Maps promulgated by Google Inc., 1600 Amphitheatre Parkway, Mountain View, Calif. 94043. Assume that Google Maps is being requested at block 205. Such a request will contain, at a packet level, unique characteristics (for example, the destination IP address of server 62; unique data strings associated with traffic associated with that application) that can be extracted using DPI engine 75. These unique characteristics can then be forwarded to application function engine 78. Application function engine 78, in turn, can maintain a look-up table, or the equivalent, that associates the unique characteristics extracted by DPI engine 75 to the service being requested at block 205. Application function engine 78 thus maintains associations between unique packet characteristics and a plurality of different services that may be accessed by device 58 via GGSN 54. Thus, in the present example, at block 215 it will be determined that the request at block 205 was for the Google Maps application.

Those skilled in the art will now recognize that application function engine 78 can be configured to emulate an application function server that itself is comprised of a P-CSCF and an AS and which is configured to communicate with PCRF 90 via the Rx protocol. Exemplary configurations for such an application function server can be found in the 3GPP Standards.

At block 215 a service policy is requested. Continuing with the foregoing specific example, at block 215, GGSN 54 communicates with PCRF 90 over link 98 using the Rx protocol to request a service policy that should be associated with the request made at block 205. The service policy request will include both the identity of device 58 that made the request at block 205 and the service characteristics determined at block 210.

The service policy request includes the SUB ID of device 58, which is sent to PCRF 90 via link 98 utilizing the Rx protocol associated with link 98. Application function engine 78 uses the Rx protocol to request that a specific Policy be applied, and provides the SUB ID, service characteristics, etc. PCRF 90 then returns the policy decision to GGSN 54 over link 94 utilizing the Gx protocol. The service policy request additionally includes the service characteristics determined at block 210. The service characteristics are sent from application function engine 78 to PCRF 90 via link 98 utilizing the Rx protocol associated with link 98. The service profile request will thus include, in this example, the fact that the service 70 that is being requested is Google Maps. Those skilled in the art will now recognize that the information with respect to the service 70 characteristics and attributes received via the Rx protocol 94 and link 98 will complement and augment the information received via the Gx protocol allowing the PCRF to provide a rating and policy determination that is more granular and comprehensive relative to the case where only service 70 characteristics and attributes were only received via the Gx protocol and link 94. PCRF 90 will thus receive the request issued at block 215, including both the identity of device 58 and the service characteristics. PCRF 90 will, in turn, contact SPR 102 in order to request subscriber profile data. The subscriber profile data retrieved from SPR 102 will include service profile criteria associated with service 70 that is respective to at least one of device 58 and subscriber S. Such input information includes a rate of charge to be charged to the account associated with device 58 or subscriber S in association with fulfilling service requests from device 58 for service 70.

The nature and scope of such service profile criteria information is not particularly limited. For example, service policy criteria can include a flag indicating that access of service 70 is not permitted whatsoever by device 58 such that device 58 will be prevented access to service 70. Where access to service 70 is permitted according to the service policy criteria, then the service policy criteria can include rating information, which can include complex criteria, such as, at least one of: times of day, week or month that access to service 70 is restricted or prevented; tiered rates of charge for accessing service 70 depending on the time of day service 70 is being accessed; maximum bandwidth allocations associated with access to service 70; maximum amounts of data that can be accessed from service 70; tiers of rates associated with higher bandwidths or capacities; tiers of rates associated with whether device 58 is roaming or within its home network; privacy management that anonymizes certain data carried between device 58 and service 70; flat rate charges for unlimited access to service 70; and combinations of any of the foregoing. Other service policy criteria will now occur to those of skill in the art. Indeed, service policy criteria can be found in the Applicants' co-pending application number PCT/CA2007/001528 and entitled Policy Services, the contents of which are incorporated herein by reference.

To continue with a specific example, assume that SPR 102 includes service policy criteria that indicates that subscriber S is permitted to access Google Maps service 70, and that the rate of charge to be applied is a flat rate of one-dollar on a post-paid basis for unlimited access to Google Maps service 70 for a twenty-four hour period. Such service policy criteria will then be returned to PCRF 90. PCRF 90 will, in turn, establish a service policy based on the service policy criteria that includes the start time of the twenty-four hour period and the one-dollar rate of charge, and send that service policy decision back to GGSN 54. In a present embodiment, the service policy decision is sent back via link 94 using the Gx protocol.

Referring again to FIG. 2, at block 220 the service policy is received. The service policy at block 220 corresponds (in the sense that the policy decision has some relation to the original request) to the service policy requested at block 215. Continuing with the present example, the service policy is received at GGSN 54 via link 94 using the Gx protocol.

At block 225, a determination is made as to whether the service is permitted. In the present embodiment, the service policy that is received at block 220 is utilized by PCEF 76 to determine whether the service 70 requested at step 205 is even permitted. If the service 70 is not permitted according to the received service policy, then at block 230 the service request from block 205 is denied and method 200 ends. In the foregoing example, recall however that the service policy did indicate that service 70 was permitted and thus at block 225 the determination would be made that "yes", the service requested at block 205 is permitted.

At block 240, the service request is fulfilled. Block 240 is accomplished by completing a virtual connection so that device 58 can interact with server 62 in order to provide service 70 on client device 58 in the usual manner, as if PCEF 76 did not exist.

At block 245, the service policy is applied. Block 245 is accomplished by PCEF 76 using the service policy received at block 220 in order to, as consistent with the foregoing example, permit unlimited access to service 70 for a twenty-four hour period commencing substantially from the time that the request at block 205 was actually received by GGSN 54, and to also instruct OCS 82, via link 86, to apply a one dollar charge to the post paid account (possibly using a CDR, as appropriate) in association with at least one of device 58 and subscriber S. It will now be generally understood that PCEF 76 will apply any service policy, and not just the exemplary service policy discussed herein, that happens to be received at GGSN 54 at step 220.

At block 250, a determination is made as to whether the service continues. If the service does not continue then method 200 ends. If the service does continue then method 200 returns to step 225. The determination at step 250 can be made various ways. For example, subscribers at client device 54 could enter a command to discontinue its access of server 70. Should method 200 move from block 250 to block 225, then the determination during this cycle through block 225 could result in a determination that the service policy that previously permitted access at block 225 is no longer applicable. In accordance with the previous specific example, the determination during this cycle at block 225 could be "no" once a period of twenty-four hours had elapsed. (Alternatively, at the twenty-four hour mark, the determination could be "yes" except then an additional dollar charge would then be applied at block 245 and another twenty-four hour period established.).

It should now be understood that also as part of block 225, a consultation can be made from GGSN 54 to OCS 82 to establish whether the account associated with subscriber S still satisfies acceptable criteria. For example, if subscriber S had a maximum dollar limit on the post-paid account associated with subscriber S, and if that amount was exceeded, then the determination at block 225 could be "no" on the basis that. (As another example, varying from the specific example above, if subscriber S has a prepaid account on OCS 82 then the determination could be whether or not the prepaid account was depleted.)

Figure 3:
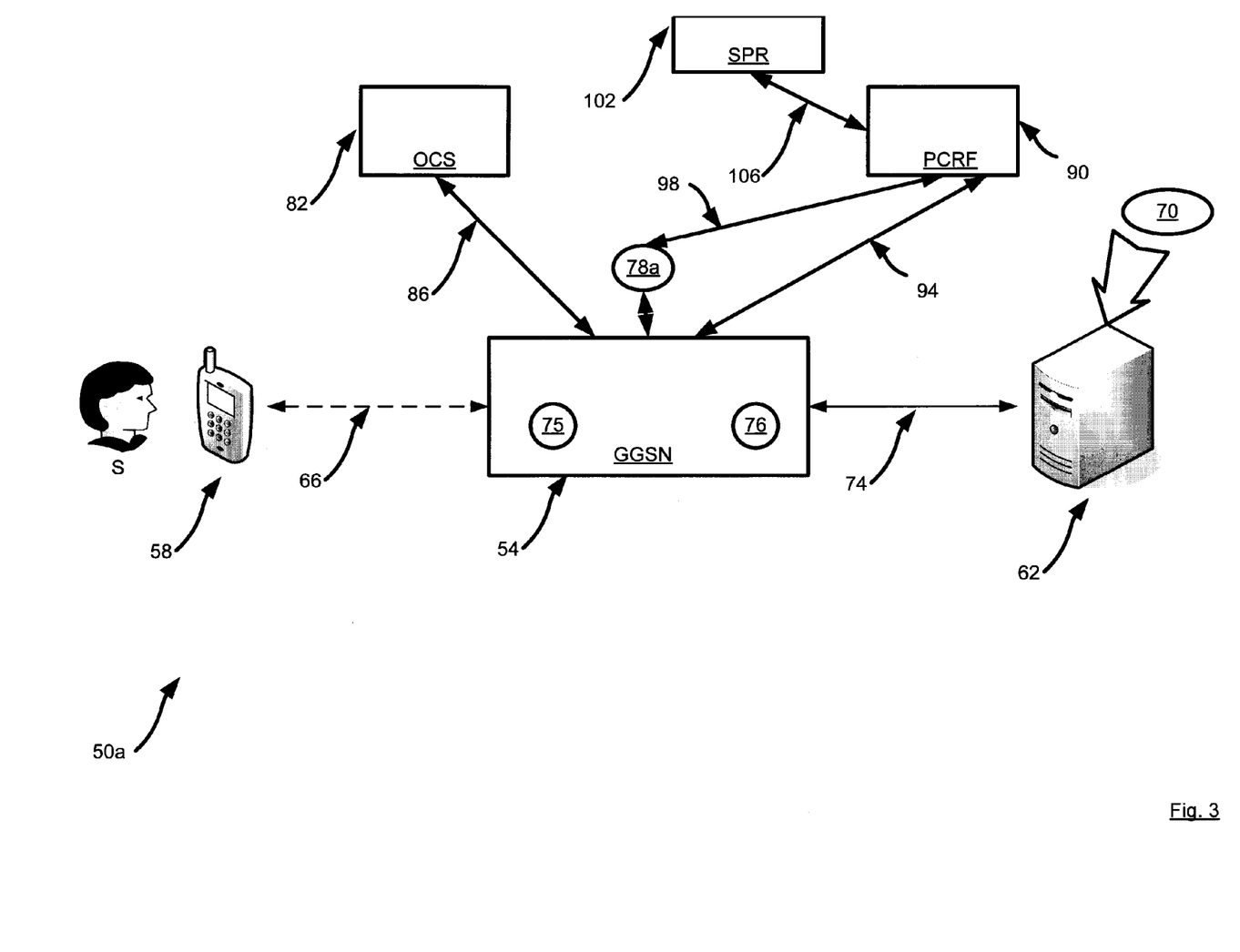
FIG. 3 is a schematic representation of a communication system incorporating a variation on the system of FIG. 1.

While the foregoing describes certain specific embodiments, it is to be reemphasized that those embodiments are exemplary and can be modified and that variations, subsets and combinations of those embodiments are contemplated. For example, referring now to FIG. 3, another communication system is indicated generally at 50*a*. Communication system 50*a* is substantially the same as system 50 and therefore like elements bear like references. Of note, however, is that in system 50*a* application function engine 78 is replaced by application function engine 78*a*. Application function engine 78*a* is not resident within GGSN 54 but is implemented within a separate piece of hardware that is accessible to GGSN 54. As still further examples of variations, application function 78 can be embedded within PCRF 90 instead of GGSN 54. As still further examples of variations, application function 78 can be embedded as a software process within DPI engine 75 instead of as a separate process on GGSN 54. As a still further example, the teachings of PCT/CA2007/001528 can be incorporated into the teachings herein.

The novel teachings herein can provide certain advantages. For example, where network infrastructures do not conform with the IP Multimedia Subsystem architectures with respect to the support of an explicit link from an Application Function to a Policy Control and Rating Function, there can still be a need to provide policy and rating functionality as a suitably granular and comprehensive basis. The teachings herein can satisfy this need.

All third party documents referenced are incorporated herein by reference.

The invention claimed is:

1. A communication system comprising:
   a GGSN including a central processing unit and a network interface, said GGSN interconnecting a client device having a unique identifier, and a server hosting a service;
   said GGSN configured to connect to a PCRF via said network interface, using a first protocol and a second protocol;
   said central processing unit configured to receive a request, via said network interface, for said service from said client device and to determine service characteristics by inspecting said request;
   said central processing unit configured to send said unique identifier and said service characteristics to said PCRF using said second protocol;
   said central processing unit configured to receive a service policy from said PCRF using said first protocol, said service policy based on said unique identifier and said service characteristics; and
   said central processing unit configured to apply said service policy during fulfillment of said request.

2. A communication system comprising:
   a gateway including a central processing unit and a network interface, said gateway interconnecting a client device having a unique identifier and a server hosting a service;
   said gateway configured to connect to a policy server via said network interface, using a first protocol and a second protocol;
   said central processing unit configured to receive a request, via said network interface, for said service from said client device and to determine service characteristics by inspecting said request;

said central processing unit configured to send said unique identifier and said service characteristics to said policy server using said second protocol;

said central processing unit configured to receive a service policy from said policy server using said first protocol, said service policy based on said unique identifier and said service characteristics; and said central processing unit configured to apply said service policy during fulfillment of said request.

3. The system claim 2 wherein said gateway comprises a DPI engine executable by said processor and configured to determine said service characteristics.

4. The system of claim 3 wherein said DPI engine is configured to cooperate with an application function engine in order to determine said service characteristics.

5. The system of claim 4 wherein said application function engine is a process incorporated into said gateway.

6. The system of claim 4 wherein said application function engine is a process incorporated into said DPI engine.

7. The system of claim 4 wherein said application function engine is implemented in hardware separate from said gateway.

8. The system of claim 4 wherein said application function engine is implemented as a process in said policy server.

9. The system of claim 2 further comprising a charging server connected to said gateway, said charging server for applying a charge to an account associated with said client device.

10. The system of claim 9 wherein said charge is applied to said account substantially in conjunction with said gateway permitting fulfillment of said request.

11. The system of claim 2 wherein said server is a second client device and said service is a peer to peer application.

12. The system of claim 2 wherein said service includes at least one of an application, software downloads, web-pages, instant messaging, email, web-mail, mapping services, location applications, social networking, file sharing, peer-to-peer services, voice over IP, music or video streams or downloads.

13. A communication method comprising:

receiving a service policy request at a gateway from a client device having a unique identifier, said gateway configured to connect to a policy server using a first protocol and a second protocol;

determining service characteristics associated with said request at said gateway;

sending said unique identifier and said service characteristics from said gateway to said policy server using said second protocol;

receiving, at said gateway, a service profile from said policy server using said first protocol;

denying said request if said service profile does not permit said service; and fulfilling said request at said gateway by permitting said client device to connect to said service, said fulfilling performed in accordance with said service policy if said service profile permits said service.

14. The method of claim 13 wherein said gateway comprises a DPI engine configured to determine said service characteristics.

15. The method of claim 14 wherein said DPI engine is configured to cooperate with an application function engine in order to determine said service characteristics.

16. The method of claim 13 wherein said first protocol is the Gx protocol and wherein said second protocol is the Rx protocol.

17. The method according to claim 13 further comprising applying a charge to an account associated with said client device, said charge in accordance with said service policy.

18. The method of claim 17 wherein said charge is applied to said account substantially in conjunction with said gateway performing said fulfilling.

* * * * *